United States Patent [19]
Okabe et al.

[11] 3,859,412
[45] Jan. 7, 1975

[54] PROCESS FOR PRODUCTION OF ALKALI METAL CHROMATES

[75] Inventors: Taijiro Okabe, Sendai; Koji Kashiwase, Chiba, both of Japan

[73] Assignee: Nippon Chemical Industries Co., Ltd., Tokyo, Japan

[22] Filed: Jan. 2, 1974

[21] Appl. No.: 430,124

[52] U.S. Cl..................... 423/61, 423/53, 423/596
[51] Int. Cl............................................. C01g 37/14
[58] Field of Search ................. 423/53, 58, 61, 596

[56] References Cited
UNITED STATES PATENTS

| | | | |
|---|---|---|---|
| 784,640 | 3/1905 | Suchy | 423/61 |
| 1,866,648 | 7/1932 | Hackhofer | 423/61 |
| 2,166,549 | 7/1939 | Laury | 423/596 |
| 3,510,256 | 5/1970 | Schafer | 423/61 |

FOREIGN PATENTS OR APPLICATIONS

| | | | |
|---|---|---|---|
| 163,814 | 2/1904 | Germany | 423/61 |
| 507,362 | 6/1939 | Great Britain | 423/61 |

Primary Examiner—Herbert T. Carter
Attorney, Agent, or Firm—Sughrue, Rothwell, Mion, Zinn & Macpeak

[57] ABSTRACT

A process for producing alkali metal chromates which comprises reacting a chrome ore with an alkali metal hydroxide in a molten state and in the presence of 1 to 2.5 moles of an alkali metal salt of a nitrogen oxyacid, the alkali metal hydroxide being present in a ratio of more than 2 moles per mole of $Cr_2O_3$ present in the chrome ore, and leaching the resulting alkali metal chromates from the reaction product. Embodiments include adding a nitrogen oxyacid to the leaching residue obtained after leaching the alkali metal chromate to recover the alkali metal content in the residue as an alkali metal salt of the nitrogen oxyacid for reuse in the reaction of the chrome ore with the alkali metal hydroxide and an alkali metal salt of a nitrogen oxyacid, and/or conducting the reaction of the chrome ore with the alkali metal hydroxide and an alkali metal salt of a nitrogen oxyacid in the presence of $SiO_2$ in an amount sufficient to provide an $SiO_2/Al_2O_3$ molar ratio of 1 to 3 based on the amount of $Al_2O_3$ present in the chrome ore.

10 Claims, 1 Drawing Figure

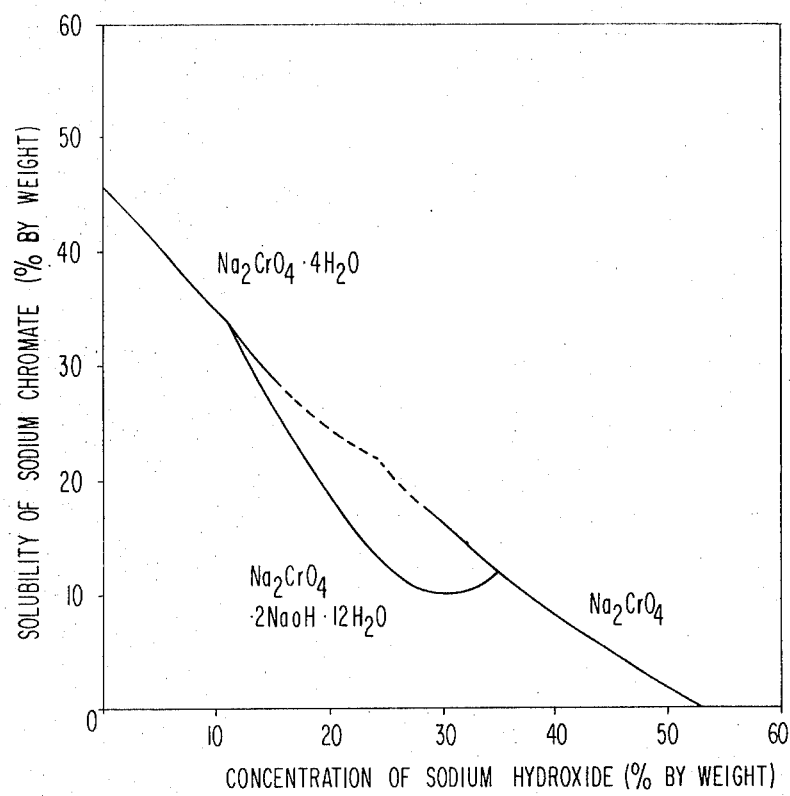

PROCESS FOR PRODUCTION OF ALKALI METAL CHROMATES

BACKGROUND OF THE INVENTION

1. Field of the Invention

This invention relates to a process for the production of alkali metal chromates from a chrome ore. More particularly, this invention relates to a process for the production of alkali metal chromates by reacting a chrome ore and an alkali metal hydroxide in the presence of an alkali metal salt of a nitrogen oxyacid and, optionally, in the presence of a specified amount of $SiO_2$.

2. Description of the Prior Art

It is well known that alkali metal chromates are very important raw materials for producing various chromates, bichromates, chromium oxides and the like.

Hithertofore, the alkali metal chromates have been produced from a chrome ore containing predominantly chromite by adding soda ash, lime or sometimes an alkali metal hydroxide to the chrome ore and heating the mixture at a temperature in the range of 1,000° to 1,200°C while introducing air or oxygen.

The reaction in the above process can be represented by the following equation (1)

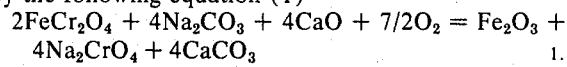

However, in the above conventional process, there are various disadvantages, e.g., 1. the productivity of the alkali metal chromates from the chrome ore, i.e., the utilization of the chromium contained in the chrome ore is low and is generally on the order of 75 to 95%, 2. due to the low utilization of chromium as set forth in (1) above, a portion of the chromium, as a loss, remains in the residue which is difficult to treat additionally, 3. the reaction temperature required is relatively high and accordingly the reactor used in the reaction tends to be deteriorated rapidly and thus the reactor must be constructed of expensive materials having sufficient heat-resistant and anticorrosive, particularly, alkali-resistant properties, and 4. a large quantity of a residue obtained after leaching or a filler must be charged into the reactor in order to ensure a sufficient contact of the chrome ore with air or oxygen and also to ensure a smooth reaction.

German Pat. No. 509,133 teaches a process for producing alkali metal chromates comprising a reaction between chrome ore and soda ash at a temperature of 500° to 700°C in the presence of calcium nitrate in order to prevent sintering and at the same time to increase the oxidation with oxygen by air diffusion, but the above process is not said to be advantageous in the production of alkali metal chromates on an industrial scale in view of the fact that calcium nitrate is not easily handled because of its remarkable hygroscopic property and it is not commercially available.

Also, a process for producing alkali metal chromates which comprises treating a chrome ore with an alkali metal hydroxide at a relatively low temperature has been proposed, but in this process, the reaction does not proceed at a satisfactory rate. In order to promote the reaction, the addition of manganese ore, a permanganate, a copper oxide, lead oxide, iron oxide and the like to the reaction system and the introduction of fine bubbles of air or oxygen into the reaction system have also been proposed, but none of the above processes is considered to be advantageous since these techniques do not improve the reaction rate to a satisfactory degree and, rather, they make the subsequent treatments of the reaction mixture difficult or cumbersome.

Further, a process for producing alkali metal chromates using an alkali metal nitrate instead of an alkali metal carbonate or an alkali metal hydroxide has been proposed. The main reaction of this conventional process is believed to be as follows:

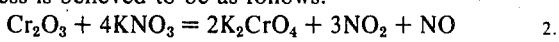

However, this process has not been utilized widely in the industrial production of alkali metal chromates due to disadvantages such as a low reaction rate, a difficulty in separating the desired product after completion of the reaction, a generation of a large amount of toxic gases such as nitrogen oxides.

Furthermore, in the process of this type where an alkali metal hydroxide is incorporated into a chrome ore followed by heat-reacting the mixture in a molten state in the presence of an alkali metal salt of a nitrogen oxyacid to produce alkali metal chromates, a large portion of the $Al_2O_3$ component present in the chrome ore generally tends to react with the alkali metal hydroxide to form a water-soluble aluminate which is also leached into the leaching liquid in the leaching step of the alkali metal chromates. The presence of the water-soluble aluminate in the leaching liquid drastically prevents the efficiency of subsequent steps for recovery of the desired alkali metal chromates and, therefore, the utilization of chromium in the ore is reduced. That is, the removal of the $Al_2O_3$ component from the above described leaching liquid must be effected in the form of an aluminum hydroxide precipitate which is produced by adding an acid to the leaching liquid, but the aluminum hydroxide precipitate is usually hydrated fine particles and often in the form of a gelled and bulky material which makes the filtration and washing extremely difficult. Thus, the formation of such a gelled hydrated aluminum hydroxide causes serious problems, for example, loss of chromium and an alkali metal hydroxide and makes the disposal of the separated aluminum hydroxide difficult.

SUMMARY OF THE INVENTION

As a result of extensive investigations on a process which is easily adaptable to the production of alkali metal chromates from chrome ore on an industrial scale and which does not have the above described disadvantages encountered in the conventional processes, it was found that alkali metal chromates can effectively be produced by incorporating an alkali metal hydroxide and an alkali metal salt of a nitrogen oxyacid and conducting the oxidation reaction under specific conditions.

The process according to the present invention as set forth above substantially eliminates the disadvantages associated with the conventional processes, but on the other hand a relatively large amount of an alkali metal hydroxide remains in a leaching residue which is obtained by leaching the resulting alkali metal chromates from the reaction product thereby reducing the efficiency of the alkali metal hydroxide used as a raw material and, at the same time, making the disposal of the leaching residue troublesome. It is very difficult to remove the remaining alkali metal hydroxide even when the leaching residue is repeatedly leached with a large amount of water.

As a result of further investigations on a recovery of the remaining alkali metal in the leaching residue obtained in the above process, it was found that the remaining alkali metal in the leaching residue can effectively be recovered by reacting the residue with a nitrogen oxyacid to form an alkali metal salt of the nitrogen oxyacid. The salt thus recovered can efficiently be utilized in the reaction of the chrome ore with an alkali metal hydroxide as described above.

As set forth previously, the $Al_2O_3$ component in the chrome ore forms a water-soluble aluminate which presents various problems in the production of alkali metal chromates using an alkali metal hydroxide. As a result of further investigations on the formation of the water-soluble aluminate, it was found that the water-solubilization of the $Al_2O_3$ component in the production of alkali metal chromates from a chrome ore can be prevented or minimized by using silica which insolubilizes the $Al_2O_3$ component.

This invention thus provides a process for producing alkali metal chromates which comprises reacting a chrome ore with more than 2 moles of an alkali metal hydroxide per 1 mole of $Cr_2O_3$ contained in the chrome ore in a molten state in the presence of 1 to 2.5 moles of an alkali metal salt of a nitrogen oxyacid at a temperature in the range of from 400° to 700°C.

An additional embodiment of the present invention provides a process for producing alkali metal chromates as set forth above which further comprises reacting a residue, which is obtained by leaching the resulting alkali metal chromates from the reaction product of a chrome ore, an alkali metal hydroxide and an alkali metal salt of a nitrogen oxyacid, with a nitrogen oxyacid to recover the alkali metal content remaining in the leaching residue as an alkali metal salt of the nitrogen oxyacid for reuse in the reaction with the chrome ore, an alkali metal hydroxide and an alkali metal salt of the nitrogen oxyacid as the first step.

Another embodiment of the present invention provides a process for producing alkali metal chromates as set forth above which further comprises carrying out the reaction of a chrome ore with the alkali metal hydroxide and an alkali metal salt of a nitrogen oxyacid in the presence of $SiO_2$ in an amount sufficient to maintain the molar ratio of $SiO_2/Al_2O_3$ in the reaction mixture at 1 to 3.

BRIEF DESCRIPTION OF THE ACCOMPANYING DRAWING

The FIGURE is a graph showing the solubility of sodium chromate in an aqueous solution of sodium hydroxide in a $Na_2CrO_4$—$NaOH$—$H_2O$ system at 25°C, the abscissa representing the concentration of sodium hydroxide (% by weight) and the ordinate representing the solubility of sodium chromate (% by weight).

DETAILED DESCRIPTION OF THE INVENTION

Suitable examples of the alkali metal hydroxides which can be used in the present invention are alkali metal hydroxides such as sodium hydroxide, potassium hydroxide and lithium hydroxide. It is preferred from an industrial standpoint that the alkali metal hydroxide which is separated and recovered from the reaction product be recycled to the reaction between a chrome ore and the alkali metal hydroxide as hereinafter described in greater detail.

Typical examples of alkali metal salts of a nitrogen oxyacid which can be used in the present invention are the sodium, potassium or lithium salts of a nitrogen oxyacid such as nitric acid, nitrous acid and the like. In particular, in the embodiment where the alkali metal content in a residue from the leaching step is recovered as an alkali metal salt of a nitrogen oxyacid by reacting the alkali metal contained in the residue with the nitrogen oxyacid, it is preferred to use nitric acid as a nitrogen oxyacid and to use the alkali metal nitrate thus recovered in place of all or a portion of the alkali metal salt of a nitrogen oxyacid used in the reaction.

The chrome ore which can be used in the present invention generally comprises predominantly chromite having a composition (by weight) of 45 to 65% $Cr_2O_3$, 10 to 26% FeO, 5 to 15% $Al_2O_3$, 6 to 15% MgO together with a minor proportion of gangue minerals such as peridotite, serpentine, talc, dolomite, magnetite, clay, and the like and other foreign matter. As a chrome ore suitable for the production of alkali metal chromates, i.e., the so-called chrome ore for chemicals, those having a high content of $Cr_2O_3$ and a low content of $Al_2O_3$ and $SiO_2$ have been used in general. In this invention, however, in addition to the above described ore, an ore of low quality and a chrome ore for metallurgy or refractory materials, which chrome ore predominantly contains $SiO_2$, $Al_2O_3$ and the like, can also be utilized.

In carrying out the process of this invention, it is necessary to adjust the proportion of the alkali metal hydroxide and the alkali metal salt of a nitrogen oxyacid relative to the $Cr_2O_3$ component within the preferred range and to conduct the reaction at the optimum temperature since the $Cr_2O_3$ content in chrome ores varies depending upon the production locate, the type of ores, and the composition. That is, when an alkali metal nitrate is used as the alkali metal salt of the nitrogen oxyacid, the alkali metal hydroxide is generally used in a proportion of more than 2 moles, preferably 10 to 25 moles, per mole of $Cr_2O_3$ and the alkali metal nitrate is generally used in a proportion of more than about 1 mole, preferably 1.2 to 1.5 moles per 1 mole of $Cr_2O_3$ in the chrome ore. When an alkali metal nitrite is used as the alkali metal salt of the nitrogen oxyacid, the alkali metal hydroxide is generally used in a proportion more than 2 moles, preferably 10 to 20 moles per 1 mole of $Cr_2O_3$ and the alkali metal nitrite is generally used in a proportion of about 2 to 2.5 moles per 1 mole of $Cr_2O_3$. When the alkali metal nitrate and the alkali metal nitrite are used as a mixture, the molar ratio of the mixture to the $Cr_2O_3$ component can be a medium value of the arithmetic mean in proportion to the ratio of the alkali metal nitrate and the alkali metal nitrite in the mixture. When the amount of the alkali metal hydroxide relative to the $Cr_2O_3$ content in the chrome ore is lower than the above proportion, the chromium in the ore is not sufficiently utilized. The alkali metal hydroxide can be used in an amount higher than the above range without adversely affecting the reaction since any excess alkali metal hydroxide which is not reacted with the chromium can be recovered although the amount is naturally limited by the capacity of the apparatus used and economic considerations. Also, when the amount of the alkali metal salt of a nitrogen oxyacid is lower than the above proportion, the chromium in the ore is not sufficiently utilized and when the alkali metal salt of the nitrogen oxyacid is used in an excess amount, the generation of nitrogen oxides may cause environmental pollution.

The reaction temperature ranges from about 400° to about 700°C, preferably 400° to 600°C. At temperatures lower than about 400°C the reaction proceeds slowly thereby requiring a prolonged period of time in order to ensure a high utilization of the chromium. At temperatures higher than about 700°C the heat supply requirements increase thereby making the process uneconomical and, at the same time, the corrosion due to the alkali metal hydroxide in the apparatus and other materials increases.

The reaction according to the process of this invention can be carried out using the above described raw materials and reaction conditions in a batch manner in a tank type reactor, a multi-bed tank type continuous reactor, a rotary kiln or the like while heating with an electrical heater or a heavy oil or liquefied petroleum gas burner.

After completion of the reaction, the reaction product is leached with water or a dilute aqueous solution of alkali metal chromate to obtain an aqueous solution of a mixture of alkali metal chromates and alkali metal hydroxide as a leaching liquid. The desired alkali metal chromates can then be precipitated from the leaching liquid by concentrating the liquid or by adding an additional amount of an alkali metal hydroxide to decrease the solubility of the alkali metal chromates in the leaching liquid, separating the precipitated alkali metal chromate by filtration to obtain the desired alkali metal chromate and at the same time recycling the mother liquor containing the alkali metal hydroxide to the initial reaction of the chrome ore with the alkali metal hydroxide and an alkali metal salt of nitrogen oxyacid.

Referring now to the FIGURE, the graph shows the solubility of sodium chromate in an aqueous solution of sodium hydroxide at a temperature of 25°C in a $Na_2CrO_4-NaOH-H_2O$ system determined by the present inventors and it will be apparent from the graph that the alkali metal hydroxide can be effectively recovered. That is, the graph indicates that, when the concentration of sodium hydroxide approaches 50% by weight, sodium chromate is substantially insoluble in the system and precipitated, and the desired sodium chromate can effectively be separated by taking advantage of the above phenomenon.

Although the exact mechanism of the action of the alkali metal salt of the nitrogen oxyacid is not at present completely understood, the alkali metal salt of the nitrogen oxyacid in the state of a eutectic mixture with the alkali metal hydroxide is believed to be a main oxygen source in the oxidation decomposition of the chrome ore as well as an alkali source thereby promoting the production of alkali metal chromates as represented by the following equations (3) and (4):

$$5Cr_2O_3(\text{in ore}) + 14MOH + 6MNO_3 \rightarrow 10M_2CrO_4 + 3N_2 + 7H_2O \qquad 3.$$

$$Cr_2O_3(\text{in ore}) + 2MOH + 2MNO_2 \rightarrow 2M_2CrO_4 + N_2 + H_2O \qquad 4.$$

wherein M represents an alkali metal.

Also, each of the alkali metal hydroxide and the alkali metal salt of the nitrogen oxyacid has a melting point lower than 400°C and therefore a mixture of these agents forms a completely eutectic mixture at a temperature of least 400°C. In the conventional process, the formation of such a eutectic mixture has been believed to adversely affect the production of alkali metal chromates since the mixture prevents the chrome ore from contacting air or oxygen in the oxidation reaction. However, in accordance with the process of this invention, the oxidation reaction can preferably be effected with an alkali metal salt of a nitrogen oxyacid in the state where the chrome ore is more completely dispersed in the eutectic mixture by incorporating a large quantity of an alkali metal hydroxide, whereby a high utilization of the chromium present in the chrome ore can be achieved.

As described above, an excellent effect can be attained in accordance with the process of this invention which is conducted using a specific proportion of an alkali metal salt of a nitrogen oxyacid and an alkali metal hydroxide relative to the $Cr_2O_3$ content in the chrome ore at a specific temperature range, but the problem which remains unsolved with such a process is that the leaching residue obtained after leaching the reaction product with water always contains a relatively large amount of the alkali metal used in the reaction. This alkali metal content cannot effectively be recovered for reuse even when the residue is repeatedly extracted with a large amount of water.

As a result of the study for recovering such an alkali metal, it was found that the extraction of the alkali metal from the residue can rapidly be accomplished when the residue is reacted with a nitrogen oxyacid. The extraction can advantageously be carried out by re-slurring the residue in water, adding slowly the nitrogen oxyacid while stirring and, if necessary after allowing the mixture to stand, separating a liquid from the residue. The extract thus obtained contains an alkali metal salt of the oxyacid (for example, an alkali metal nitrate when nitric acid is used as a nitrogen oxyacid) and a small amount of alkali metal chromate, and can be employed, after it is appropriately concentrated, in the reaction of the chrome ore with the alkali metal hydroxide and an alkali metal salt of a nitrogen oxyacid as described above.

Although the exact mechanism of the action of the nitrogen oxyacid on the alkali metal remaining in the leaching residue is not yet completely understood, it is believed that most of the alkali metal content is retained in the residue in the form of an alkali metal ferrate and the alkali metal content can be extracted gradually via hydrolysis as represented by equation (5) below when the residue is extracted with water. On the other hand, a nitrogen oxyacid reacts immediately with the above alkali metal ferrate to produce a water soluble alkali metal salt of the nitrogen oxyacid which is easily extracted as represented by equation (6) below which is exemplified by nitric acid, a typical and preferred example of the nitrogen oxyacid, $$M_2O \cdot Fe_2O_3 + H_2O \rightarrow Fe_2O_3 + 2MOH \qquad 5.$$
$$M_2O \cdot Fe_2O_3 + 2HNO_3 \rightarrow Fe_2O_3 + 2MNO_3 + H_2O \qquad 6.$$

wherein M represents an alkali metal.

According to the second embodiment of the process of this invention, it is possible not only to reduce or eliminate the above-described disadvantages (1) to (4) encountered in the conventional processes but also to recover efficiently most of the alkali metal content in the residue in the form of an alkali metal salt of the nitrogen oxyacid. In addition, since the salt of the nitrogen oxyacid thus recovered can be recycled and fully reused as a nitrogen oxyacid source as well as an alkali metal source in the oxidation reaction of a chrome ore, whereby the inefficient utilization of the alkali metal hydroxide due to a large quantity of the unrecovered alkali metal remaining in the residue as is observed in the conventional process as well as the difficulty in rendering the harmful residue non-poisonous can simultaneously be solved.

In a third embodiment of the present invention, the reaction of the above described chrome ore with the alkali metal hydroxide and an alkali metal salt of nitrogen oxyacid is conducted while maintaining the molar ratio of $SiO_2/Al_2O_3$ in the reaction system at 1 to 3.

In a conventional process for producing sodium chromate, the addition of a silica component to the oxidation reaction as well as the presence of silica in the ore was believed to adversely affect the oxidation reaction for the reasons that the silica component reacts with the alkali metal hydroxide and forms a soluble alkali metal silicate. However, as a result of investigations the present inventors unexpectedly found that the addition of silica is the most effective means for insolubilizing an alumina component present in the chrome ore in the reaction of the chrome ore with the alkali metal hydroxide and an alkali metal salt of nitrogen oxyacid in a molten state and yet the silica per se does not take part in the formation of any soluble components such as an alkali metal silicate if silica is used in an amount within the specified range.

In the third embodiment of this invention, the reaction of the chrome ore with the alkali metal hydroxide and an alkali metal salt of nitrogen oxyacid in a molten state is conducted while adjusting the proportion of silica and alumina to a specified range within which the alumina component is effectively insolubilized, i.e., in a molar ratio of $1 \leq SiO_2/Al_2O_3 \leq 3$, preferably $1.5 \leq SiO_2/Al_2O_3 \leq 2.5$. When the molar ratio is less than 1, the insolubilization of the alumina component is not sufficient and a large amount of aluminates tends to be leached out in the leaching liquid. On the contrary, when the molar ratio exceeds 3, the reaction system tends to be viscous thereby making the operation difficult and, at the same time, an excess of silica is reacted with the alkali metal hydroxide to form a soluble alkali metal silicate which causes an objectionable effect similar to those set forth above for the leaching out of the soluble aluminates.

The adjustment of the molar ratio of silica and alumina in a molten reaction system can generally be accomplished by adding a predetermined amount of silica-containing material to the reaction system. Suitable examples of silica-containing materials are a crystalline silica such as silicic sand, quartzite and the like, a non-crystalline silica such as siliceous sinter, diatomaceous earth and the like, silicate minerals such as serpentine, peridotite, clays and the like, alkali metal silicates, certain high siliceous industrial chemicals, for example, white carbon, silica gel and the like, and certain by-products, for example, a slag produced in metal smelting, etc.

The adjustment of the molar ratio of $SiO_2/Al_2O_3$ to the above range can also be attained by (1) selecting and employing a chrome ore having a high $SiO_2$ content which per se has a molar ratio of $SiO_2/Al_2O_3$ within the range of 1 to 2.5 or (2) employing, as a silica-containing material, a specific chrome ore of low grade having a molar ratio of $SiO_2/Al_2O_3$ higher than 3 in combination with other chrome ores in such a proportion that the molar ratio of $SiO_2/Al_2O_3$ in the combination of ores falls within the above described operable range.

Accordingly, in the third embodiment of the present invention, it is possible to use chrome ores of low grade, i.e., those having high $Al_2O_3$ and $SiO_2$ contents generally used in metallurgy or as refractories, as well as chrome ores generally used for chemicals. In particular, a low grade chrome ore having a high $SiO_2$ content and a low $Cr_2O_3$ content which has been believed to be of little value can effectively be utilized.

The adjustment of the molar ratio of $SiO_2/Al_2O_3$ by addition of a silica-containing material in the third embodiment of this invention can be effected, for example, by the following alternative procedures:

1. previously adding the silica-containing material to the chrome ore,
2. previously adding the silica-containing material to an alkali metal hydroxide or using an alkali metal silicate formed by heating a mixture of an alkali metal hydroxide and the silica-containing material,
3. adding a silica-containing material to a mixture of a chrome ore and a molten alkali metal hydroxide prior to the reaction or during the reaction, or
4. adding a silica-containing material after completion of the reaction of a chrome ore and an alkali metal hydroxide followed by allowing the resulting mixture to react for an additional period in a molten state.

However, it is to be understood that the adjustment of the molar ratio of $SiO_2/Al_2O_3$ can be accomplished by any other suitable means as long as the alumina component is reacted with the silica component in a molten state in the above defined proportion simultaneously with the oxidation reaction of the chrome ore or subsequent to the oxidation reaction. Such a procedure will be apparent to one skilled in the art.

The reaction of a chrome ore with an alkali metal hydroxide and an alkali metal salt of nitrogen oxyacid can be carried out in a molten state at a temperature ranging from about 400° to about 700°C using more than 6 moles of the alkali metal hydroxide per 1 mole of $Cr_2O_3$ in the chrome ore. Suitable examples of alkali metal hydroxides are alkali metal hydroxides such as sodium hydroxide, potassium hydroxide and lithium hydroxide.

The resulting reaction product is then leached with water or a dilute aqueous solution of an alkali metal chromate to obtain a leaching liquid containing an alkali metal chromate and an alkali metal hydroxide. The leaching liquid thus obtained can then be subjected, as described previously, to a separation of the alkali metal hydroxide or a neutralization, and if desired, purification, concentration and crystallization, etc. which are well known to one skilled in the art to obtain the desired alkali metal chromate for use as an intermediate in industry or as a product.

Although the exact mechanism of the effect of silica employed in the present invention is not yet completely understood, it is believed that silica reacts with the alumina or an aluminate formed during the reaction of the chrome ore with the molten alkali metal hydroxide and an alkali metal salt of nitrogen oxyacid to form a certain aluminosilicate in a $SiO_2/Al_2O_3$ molar ratio of about 2 which is insoluble in the reaction system.

Thus, in accordance with the process of this invention, the following characteristic features and the advantages can be obtained over prior art process.

1. The oxidation reaction is conducted in a molten state having an excellent flowability and, therefore, almost 100% utilization of the chromium present in the chrome ore can be attained.

2. The residue obtained at the final stage after leaching of an alkali metal chromate does not contain an appreciable amount of chromium or an alkali metal hydroxide, thereby facilitating the utilization or the disposal of the residue.

3. The oxidation reaction can be accomplished in a closed vessel since oxygen or air need not necessarily be present during the reaction in view of the fact that an alkali metal salt of a nitrogen oxyacid serves as an oxidizing agent.

4. Since the reaction temperature is relatively low, i.e., 400° to 700°C, the amount of heat supply can be reduced and, in addition, expensive materials having a high thermal resistance and anti-corrosive properties need not be used for the apparatus. That is, the requisite apparatus can be made from an inexpensive metal materials.

5. There is no necessity for incorporating a sintering inhibitor such as a residue obtained after leaching of the chromium into the raw material in the reactor whereby the efficiency of the operation can be increased.

6. The generation of toxic gases during the reaction can be prevented whereby environmental pollution is prevented.

7. A chrome ore of a low grade which has been believed to be of little value can effectively be utilized.

8. A large proportion of $Al_2O_3$ contained in a chrome ore is fixed in a leaching residue as an insoluble compound (probably, a certain aluminosilicate) and thus the problems encountered in the removal of $Al_2O_3$ from the leaching liquid can be solved.

The present invention will now be illustrated in greater detail by the following examples but these examples are not to be construed as limiting the scope of the present invention. Unless otherwise indicated, all parts and percents are by weight.

EXAMPLE 1

A mixture of a finely divided chrome ore produced in Transvaal, South Africa ($Cr_2O_3$ content, 45.55%) and sodium hydroxide and sodium nitrate in the amount shown in Table 1 below was charged into a 3.3 l volume vertical-type reactor equipped with a stirrer followed by allowing the materials to react in a molten state by heating the mixture at a temperature of 600°C for 2 hours. After completion of the reaction, the reaction product was removed and analyzed to determine the percent production of sodium chromate (percent utilization of $Cr_2O_3$ contained in the ore) as shown in Table 1.

EXAMPLE 2

In the same manner as described in Example 1 but varying the ratios of sodium hydroxide and sodium nitrate to the $Cr_2O_3$ in the ore, the reaction was carried out at a temperature of 600°C for 1 hours. The reaction product was removed from the reactor and analyzed to determine the percent production of sodium chromate. The results obtained are shown in Table 2 below.

Table 2

| Run No. | Chrome Ore | Sodium Hydroxide | Sodium Nitrate | Molar Ratio ($NaOH/Cr_2O_3$) | Molar Ratio ($NaNO_3/Cr_2O_3$) | Percent Production of Sodium Chromate |
|---|---|---|---|---|---|---|
| | (part) | (part) | (part) | | | (%) |
| 2-1 | 160 | 305 | 25 | 13.08 | 0.61 | 62.89 |
| 2-2 | 160 | 280 | 50 | 14.60 | 1.22 | 93.52 |
| 2-3 | 149 | 228 | 113 | 12.77 | 2.98 | 95.22 |
| 2-4 | 125 | 118 | 247 | 7.88 | 7.75 | 78.04 |
| 2-5 | 99 | 0 | 391 | 0 | 15.48 | 1.72 |

EXAMPLE 3

160 parts of the chrome ore produced in Transvaal, South Africa ($Cr_2O_3$ content, 45.55%), 280 parts of sodium hydroxide and 50 parts of sodium nitrate were charged into a 3.3 l volume vertical-type reactor equipped with a stirrer followed by allowing the materials to react in a molten state by heating the reactor in a heating furnace set at a temperature (± 10°C) for the period shown in Table 3 below. After completion of the reaction, the reaction product was removed and analyzed to determine the percent production of sodium chromate (percent utilization of $Cr_2O_3$ contained in the ore). The results obtained are shown in Table 3 below.

Table 3

| Reaction Time (hrs.) | Percent Production of Sodium Chromate Reaction Temperature (°C) | | | | |
|---|---|---|---|---|---|
| | 300 | 400 | 500 | 600 | 700 |
| 1 | — | 43.8 | 55.3 | 93.5 | 96.8 |
| 2 | 76.5 | 90.0 | 93.5 | 96.0 | — |
| 3 | 90.3 | 92.9 | 96.8 | 98.2 | — |
| 5 | — | 99.5 | — | — | — |

In each case, remarkable bubbling associated with evaporation of nitrogen gas was observed during a relatively early stage of the reaction, but no coloration or offensive odor due to nitrogen oxides was perceived.

Table 1

| Run No. | Chrome Ore | Sodium Hydroxide | Sodium Nitrate | Molar Ratio ($NaOH/Cr_2O_3$) | Molar Ratio ($NaNO_3/Cr_2O_3$) | Percent Production of Sodium Chromate |
|---|---|---|---|---|---|---|
| | (part) | (part) | (part) | | | (%) |
| 1-1 | 160 | 70 | 50 | 3.65 | 1.2 | 47.66 |
| 1-2 | 160 | 140 | 50 | 7.30 | 1.2 | 86.79 |
| 1-3 | 160 | 280 | 50 | 14.60 | 1.2 | 96.05 |
| 1-4 | 160 | 420 | 50 | 21.90 | 1.2 | 93.37 |

EXAMPLE 4

In the same manner as described in Example 3 but using 66 parts of sodium nitrite in place of the sodium nitrate, the reaction was carried out at a temperature of 600°C for a period of 1 hour. The percent production of sodium chromate was found to be 93.0%. In this case, remarkable bubbling associated with evaporation of nitrogen gas was also observed, but no coloration or offensive odor due to nitrogen oxides was perceived.

EXAMPLE 5

In the same manner as described in Example 3, 200 parts of a finely divided chrome ore produced in Transvaal, South Africa ($Cr_2O_3$ content, 45.55%), 590 parts of potassium hydroxide and 79 parts of potassium nitrate were reacted in a molten state at 400°± 10°C for 3 hours. The reaction product was removed from the reactor for analysis. The percent production of potassium chromate (percent utilization of $Cr_2O_3$ contained in the ore) was found to be 95.7%.

EXAMPLE 6

A mixture of 160 parts of a finely divided chrome ore produced in South Africa ($Cr_2O_3$ content, 45.55%), 280 parts of sodium hydroxide and 50 parts of sodium nitrate was reacted in a molten state in a reactor equipped with a stirrer at a temperature of 600°C for 2 hours. After completion of the reaction, the reaction product was removed and then subjected to leaching with 700 parts of water to obtain sodium chromate. The percent production of sodium chromate (percent utilization of $Cr_2O_3$ contained in the ore) in the reaction was 96.1%, and the leaching residue was found to contain sodium corresponding to 23.3 parts of NaOH.

The leaching liquid was subsequently subjected to concentration and cooling operations to precipitate almost all of the sodium chromate as crystals, which could then be separated from the mother liquor by centrifuging. The mother liquor which contained unreacted sodium hydroxide and a portion of sodium chromate was appropriately concentrated to obtain sodium hydroxide, which could be utilized as a part of the reactant for the reaction with a chrome ore.

On the other hand, the leaching residue was reslurried in warm water, and 37 parts of·$HNO_3$ was added thereto. After completion of the reaction, the solid was separated from the solution by filtration. Since the mother liquor contained about 45 parts of sodium nitrate and a small amount of sodium chromate, it could be utilized as a major part of the sodium nitrate for the reaction with a chrome ore.

EXAMPLE 7

A mixture of 160 parts of a finely divided chrome ore produced in South Africa ($Cr_2O_3$ content, 45.5%; $Al_2O_3$ content, 13.8%; $SiO_2$ content, 0.8%), 280 parts of sodium hydroxide, 50 parts of sodium nitrate and powdered siliceous sand in the amount shown in Table 4 below was charged into a vertical-type reactor equipped with a stirrer followed by allowing the materials to react in a molten state by heating the mixture at a temperature of 600°C for 1 hour. After completion of the reaction, the the reaction product was leached with water and the leaching liquid was analyzed to determine the percent production of sodium chromate (percent utilization of $Cr_2O_3$) and the percent elution of alumina (percent water-solubilization of $Al_2O_3$ contained in the ore). The results obtained are shown in Table 4 below.

Table 4

| Run No. | Chrome Ore | Siliceous Sand | Molar Ratio ($SiO_2/Al_2O_3$) | Percent Production of Sodium Chromate | Percent Elution of Alumina | Note |
|---|---|---|---|---|---|---|
| | (part) | (part) | | (%) | (%) | |
| 3-1 | 160 | 0 | 0.1 | 97.6 | 93.5 | |
| 3-2 | 160 | 12 | 1.0 | 97.0 | 38.2 | |
| 3-3 | 160 | 25 | 2.0 | 96.3 | 3.4 | |
| 3-4 | 160 | 38 | 3.0 | 95.8 | 1.0 | |
| 3-5 | 160 | 51 | 4.0 | 95.2 | 1.8 | * |
| 3-6 | 160 | 64 | 5.0 | — | — | ** |

Note:
* A part of the $SiO_2$ was eluted in the leaching liquid.
** The reaction was discontinued due to the difficulty in stirring because of the excessive thickness of the slurry.

As is apparent from the above results, when no siliceous sand was added to the mixture, most of the alumina content present in the ore was eluted with sodium chromate (Run No. 3-1), whereas satisfactory results could be obtained when the siliceous sand was added to the mixture in such an amount that the molar ratio ($SiO_2/Al_2O_3$) was adjusted to about 1.0 to 3.0 (Run Nos. 3-2 to 3-4). The addition of the siliceous sand in an amount exceeding the above range had no effect on elution control of the alumina content, or rather adversely affected the reaction resulting in an elution of the $SiO_2$ content, difficulty in continuing of the reaction and the like.

EXAMPLE 8

A mixture of 160 parts of a finely divided chrome ore produced in India ($Cr_2O_3$ content, 48.4%; $Al_2O_3$ content, 10.8%; $SiO_2$ content, 3.65), 326 parts of sodium hydroxide and 18 parts of siliceous sinter ($SiO_2$ content, 81%) was charged into a reactor equipped with a stirrer followed by allowing the components to react by heating the mixture at 650°C for 2 hours under aeration. After completion of the reaction, the reaction product was leached with water and then the resulting leaching liquid was analyzed. Although the percent production of sodium chromate was 95.1%, the percent elution of alumina was found to be only 3.1% and it was confirmed that most of the $Al_2O_3$ content was transferred into the leaching residue.

EXAMPLE 9

In the same manner as described in Example 7 but using 393 parts of potassium hydroxide in place of the sodium hydroxide, the reaction was conducted at a temperature of 500°C for 1 hour. The percent production of potassium chromate and the percent elution of alumina were found to be 96.6% and 3.4%, respectively.

While the invention has been described in great detail with reference to the specific embodiments thereof, it will be apparent to one skilled in the art that various changes and modifications can be made therein without departing from the spirit and scope of the present invention.

What is claimed is:

1. A process for producing alkali metal chromates from a chrome ore which comprises reacting at a temperature of 400° to 700°C a chrome ore with an alkali metal hydroxide in a molten state and in the presence of from 1 to 2.5 moles of an alkali metal salt of a nitrogen oxyacid per mole of the $Cr_2O_3$ present in said chrome ore, said alkali metal hydroxide being present in an amount of more than 2 moles per mole of the $Cr_2O_3$ present in said chrome ore, and leaching the resulting alkali metal chromate from the reaction product with water or a dilute aqueous solution of an alkali metal chromate, the alkali metal of said alkali metal chromate in said dilute aqueous solution being the same as that of said alkali metal hydroxide.

2. The process according to claim 1, wherein said alkali metal salt of the nitrogen oxyacid is sodium nitrate, potassium nitrate, lithium nitrate, sodium nitrite, potassium nitrite or lithium nitrite.

3. The process according to claim 1, wherein said alkali metal hydroxide is sodium hydroxide, potassium hydroxide or lithium hydroxide.

4. The process according to claim 1, wherein said alkali metal hydroxide is used in an amount of from 10 to 25 moles per mole of $Cr_2O_3$ contained in said chrome ore.

5. The process according to claim 1, wherein said process further comprises re-slurrying a residue obtained after leaching of said alkali metal chromate in water, incorporating a nitrogen oxyacid into the resulting slurry and separating the liquid phase from the solid phase of said slurry to recover the alkali metal content in the residue in the form of an aqueous solution of an alkali metal salt of said nitrogen oxyacid for reuse in said reaction of a chrome ore with an alkali metal hydroxide and an alkali metal salt of a nitrogen oxyacid.

6. The process according to claim 5, wherein said nitrogen oxyacid is nitric acid or nitrous acid.

7. A process for producing alkali metal chromates from a chrome ore which comprises reacting at a temperature of from 400° to 700°C a chrome ore with an alkali metal hydroxide in a molten state and in the presence of from 1 to 2.5 moles an alkali metal salt of a nitrogen oxyacid per mole of the $Cr_2O_3$ and in the presence of $SiO_2$ in a $SiO_2/Al_2O_3$ molar ratio of 1 to 3 based on the amount of $Al_2O_3$ present in said chrome ore, and leaching the resulting alkali metal chromate from the reaction product with water or a dilute aqueous solution of an alkali metal chromate, the alkali metal of said alkali metal chromate in said dilute aqueous solution being the same as that of said alkali metal hydroxide.

8. The process according to claim 7, wherein said alkali salt of the nitrogen oxyacid is sodium nitrate, potassium nitrate, lithium nitrate, sodium nitrite, potassium nitrite or lithium nitrite.

9. The process according to claim 7, wherein the process further comprises re-slurrying a residue obtained after leaching of said alkali metal chromate in water, incorporating a nitrogen oxyacid into the resulting slurry and separating the liquid phase from a solid phase of said slurry to recover the alkali metal content in the residue in the form of an aqueous solution of an alkali metal salt of said nitrogen oxyacid for reuse in the reaction of a chrome ore with an alkali metal hydroxide and an alkali metal salt of a nitrogen oxyacid.

10. The process according to claim 9, wherein said nitrogen oxyacid is nitric acid or nitrous acid.

* * * * *